United States Patent [19]
Hadank et al.

[11] Patent Number: 5,381,874
[45] Date of Patent: Jan. 17, 1995

[54] AUTOMATIC LUBRICATION CONTROL

[75] Inventors: John M. Hadank, Dunlap; Kenneth J. McGuire, Peoria; David R. Meinhold, Metamora; Ron J. Penick, Henry, all of Ill.

[73] Assignee: Caterpillar Inc., Peoria, Ill.

[21] Appl. No.: 137,867

[22] Filed: Oct. 15, 1993

[51] Int. Cl.$^6$ ................. F01M 1/18; F01M 11/10
[52] U.S. Cl. ........................... 184/6.4; 184/6; 184/7.2; 184/6.19
[58] Field of Search ............... 184/6.4, 7.2, 6, 29, 184/6.19; 123/196

[56] References Cited

U.S. PATENT DOCUMENTS

| | | | |
|---|---|---|---|
| 4,147,233 | 4/1979 | Smith | 184/29 |
| 4,726,448 | 2/1988 | Schroeder et al. | 184/3.2 |
| 4,787,479 | 11/1988 | Ostermeyer et al. | 184/7.2 |
| 5,137,117 | 8/1992 | Mangen et al. | 184/7.4 |
| 5,181,585 | 1/1993 | Braun et al. | 184/7.4 |
| 5,195,612 | 3/1993 | Hahn et al. | 184/6.4 |

OTHER PUBLICATIONS

Material from Lincoln St. Louis McNeil re Centro-Matic Model 84050, Pressure Switch Model 69630 and Solid-State Timer Model 84627 dated Aug. 1984.

*Primary Examiner*—Thomas E. Denion
*Attorney, Agent, or Firm*—Steven R. Janda

[57] ABSTRACT

Large work machines typically include an automatic lubrication system for lubricating critical areas during operation. In such systems it is advantageous to provide an efficient and flexible controller having substantial diagnostic capabilities. The subject inventions provides a sensor for determining the level of an operational parameter, a device for calculating a time interval being dependent on a previous lubrication event and the operational parameter, a device for producing a lubrication signal in response to the time interval reaching a predetermined interval constant, and a lubrication control for activating a lubrication system.

4 Claims, 6 Drawing Sheets

Fig. 1

Fig_3b

Fig_4

AUTOMATIC LUBRICATION CONTROL

TECHNICAL FIELD

This invention relates generally to an automatic lubrication system for a work machine, and more particularly to an apparatus for controlling the automatic lubrication system.

BACKGROUND ART

Many large work machines, such as off-highway mining trucks, front shovels, and hydraulic excavators, include numerous moving parts that require proper lubrication to prevent premature failure. Critical areas such as wheel bearings and linkage joints are advantageously lubricated during operation to eliminate the need for stopping the machine for lubrication. To prevent premature failure, these critical areas must be frequently lubricated, e.g. it may be advantageous in some environments to lubricate the critical areas as frequently as every 5-10 minutes. Since many of these machines have enormous operating capacities, time in which the machine is not operating represents a substantial loss of capacity to the owner. Obviously, if the machine must be lubricated every 5 minutes, the machine would be stopped for lubrication as much as it was operating.

To address these needs, various systems have been developed to provide lubrication during machine operation. Generally, such lubrication systems include an air system supply line, a solenoid air valve operated in response to a control, an air-powered lubrication pump, and an injector bank located at each of the critical areas of the machine. The lubrication control typically provides a timer designed to inject lubricant into the critical areas at preset time intervals during machine operation. While such systems provide adequate lubrication, they also tend to lubricate more often than necessary since it reacts solely to time and not to the actual use of the bearings or joints. For example, if a truck is standing still, there is no need to lubricate the wheel bearings during each time interval. It is only after the truck has been moving for the predetermined time interval that lubrication is required. Thus energy and lubricant could be conserved if the lubrication system is controlled in response to the length of time the bearings are actually being used rather than in response to time alone.

Another problem arises if there is a fault condition in the lubrication system. For example, if a lubrication line is broken or has become unattached, lubricant will not reach the desired location. To address this problem, prior art systems have provided pressure switches to be activated in response to the pressure in the lubrication lines reaching a predetermined level. If the pressure does not reach that level when the lubrication system is activated, an alarm is energized to indicate that a fault condition exists. However, merely indicating that the desired pressure was not reached is insufficient information for service personnel to efficiently diagnose and repair all types of problems. It may also be important to indicate whether the lubrication system pressure has exceeded a high pressure level. For example, if a lubrication line is obstructed or if the air pressure system is operating at too high of a pressure, the lubrication system pressure will exceed the predetermined level but there will nonetheless be a fault condition. Similarly, there may be a fault within the pressure sensor itself or the wire carrying the electrical signal from the pressure sensor may be shorted to ground or to the positive supply voltage. Information regarding which of the numerous possible fault conditions in the lubrication system and pressure sensor would be extremely useful to service personnel and would reduce downtime considerably.

Some prior art lubrication systems have provided adaptability to the system by using set-screws on the timer to adjust the time between lubrication and on the pressure switch to adjust the predetermined pressure level. Such adjustments, while helpful, inadequately address the full range of adaptability and precision desired for proper lubrication control. For example, it is beneficial to provide a more precise method of setting these parameters and to provide a means for adjusting the duration of each lubrication event.

The present invention is directed to overcoming one or more of the problems set forth above.

DISCLOSURE OF THE INVENTION

The invention avoids the disadvantages of known automatic lubrication controls and provides a flexible and efficient control system for automatically lubricating critical areas of work machines. Significant diagnostic capabilities are provided to reduce the amount of time and resources required for repairs.

In one aspect of the present invention, a control for lubricating a work machine is provided. The control includes a sensor for determining the level of an operational parameter, a device for calculating a time interval being dependent upon the operational parameter and a previous lubrication event. The control also includes a device for producing a lubrication signal in response to the time interval reaching a predetermined interval constant.

The invention also includes other features and advantages which will become apparent from a more detailed study of the drawings and specification.

BRIEF DESCRIPTION OF THE DRAWINGS

For a better understanding of the present invention, reference may be made to the accompanying drawings, in which.

BEST MODE FOR CARRYING OUT THE INVENTION

Figure 1:
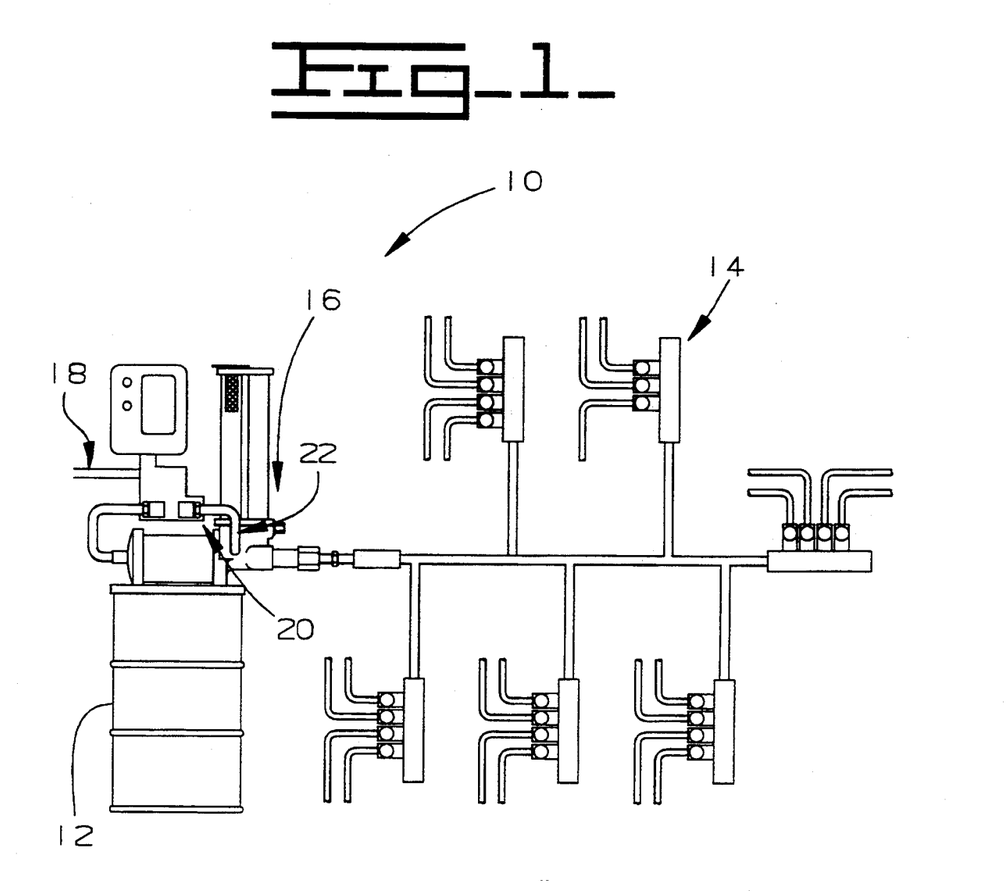
FIG. 1 is a diagrammatic view of an automatic lubrication system.

An automatic lubrication system 10 is shown generally in FIG. 1. In the preferred embodiment, lubricant is pumped from a centrally located lubricant container 12 to a plurality of injector banks 14 located strategically about a work machine (not shown). The injector banks 14 are provided to distribute lubricant within the critical areas requiring lubrication. A pump group 16 is provided to pump the lubricant from the centrally located container 12 to the various injector banks 14.

Advantageously the pump group 16 is air-powered and is connected to an air system on the work machine by an air system supply line 18. A pressure sensor 20 is advantageously connected to a lubricant supply line 22 and is adapted to produce an electrical signal in response to pressure in the lubricant supply line 22. In the preferred embodiment, the pressure sensor 20 is of a type producing a voltage signal being directly proportional to the pressure level, however other types of pressure sensors may be used without deviating from the invention.

Figure 2:
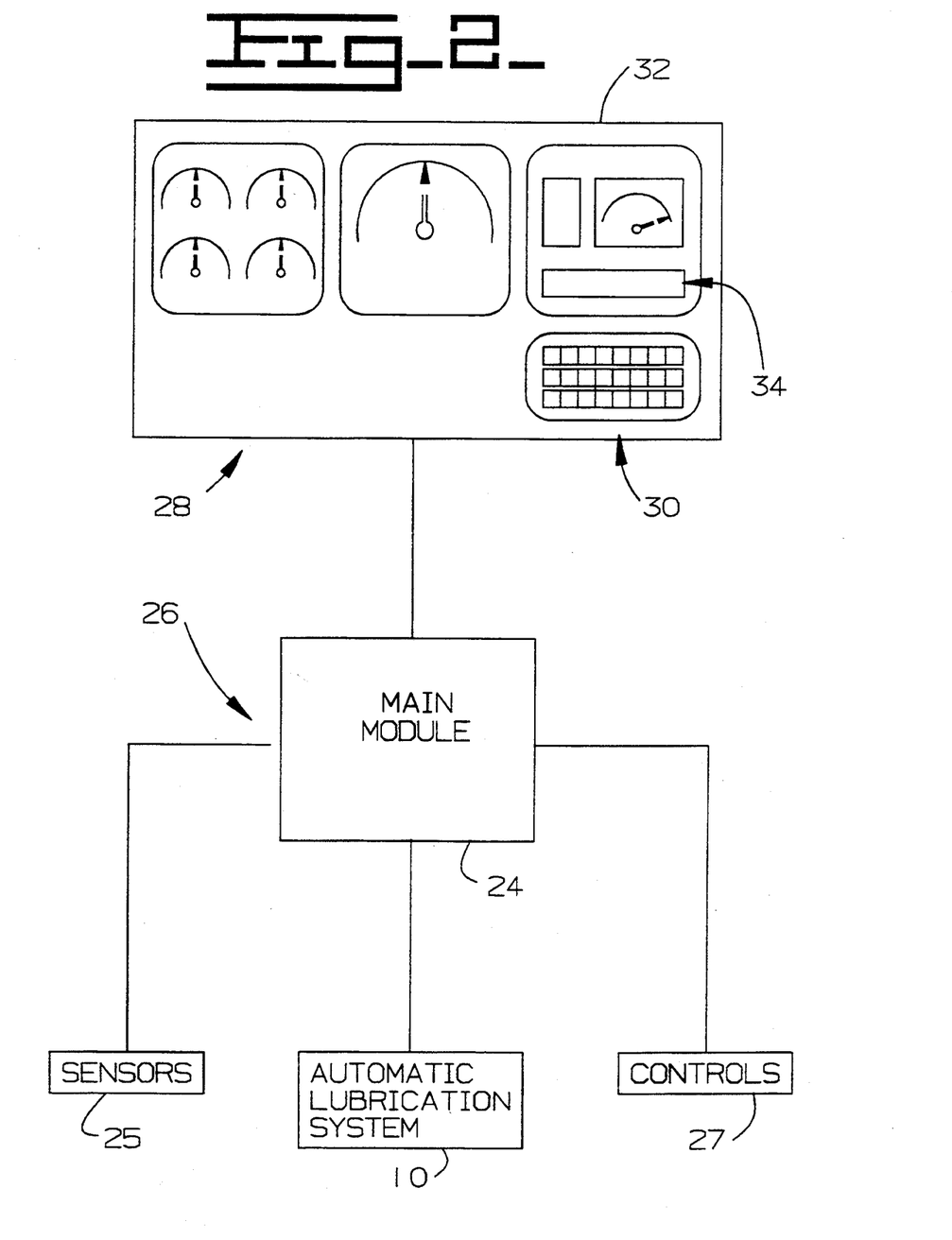
FIG. 2 is a diagrammatic view of an embodiment of the present invention.

Referring now primarily to FIG. 2, the automatic lubrication system 10 is controlled by a microprocessor located within a main module 24. In the preferred embodiment, the main module 24 not only controls the automatic lubrication system 10, but also serves to control, monitor, and diagnose faults in all other major electronic systems located on the machine. As such, the main module 24 receives sensor inputs from throughout the machine, including the pressure sensor 20 and one or more sensors associated with an operational parameter. The operational parameter typically differs for each type of work machine. For example, on large off-highway mining trucks the operational parameter is machine movement; thus the associated sensor would be advantageously the sensor associated with the machine speedometer for sensing movement of the machine. Alternatively, the sensor may be located within the transmission or final drive for sensing that the machine is moving. On other work machine, for example front shovels or hydraulic excavators, the operational parameter is operation of the implement linkages. In this case, an implement controller (not shown) would preferably be adapted to send a signal to the main module 24 whenever command signals are being produced to move the implement linkage. In this way, the movement of the implement linkages can be sensed by the main module 24 to indicate the existence of the operational parameter. The main module 24 also transmits many other control signals to various systems located throughout the machine via a communication link 26.

The main module 24 is preferably connected to a display 28 located in the operator compartment of the machine. Advantageously, the display 28 includes an operator interface 30 allowing the operator or service personnel to enter operational codes and other information to configure or otherwise affect the operation of the main module 24. The display 28 also includes a message center 32 for communicating various warning conditions to the operator and to provide other indications of machine configuration or performance. In the preferred embodiment, the message center 32 includes a message area 34 for providing text information to the operator or service personnel. The message area 34 is therefore capable of indicating quickly and efficiently the nature of any fault condition within any monitored parameter.

Figure 3A:
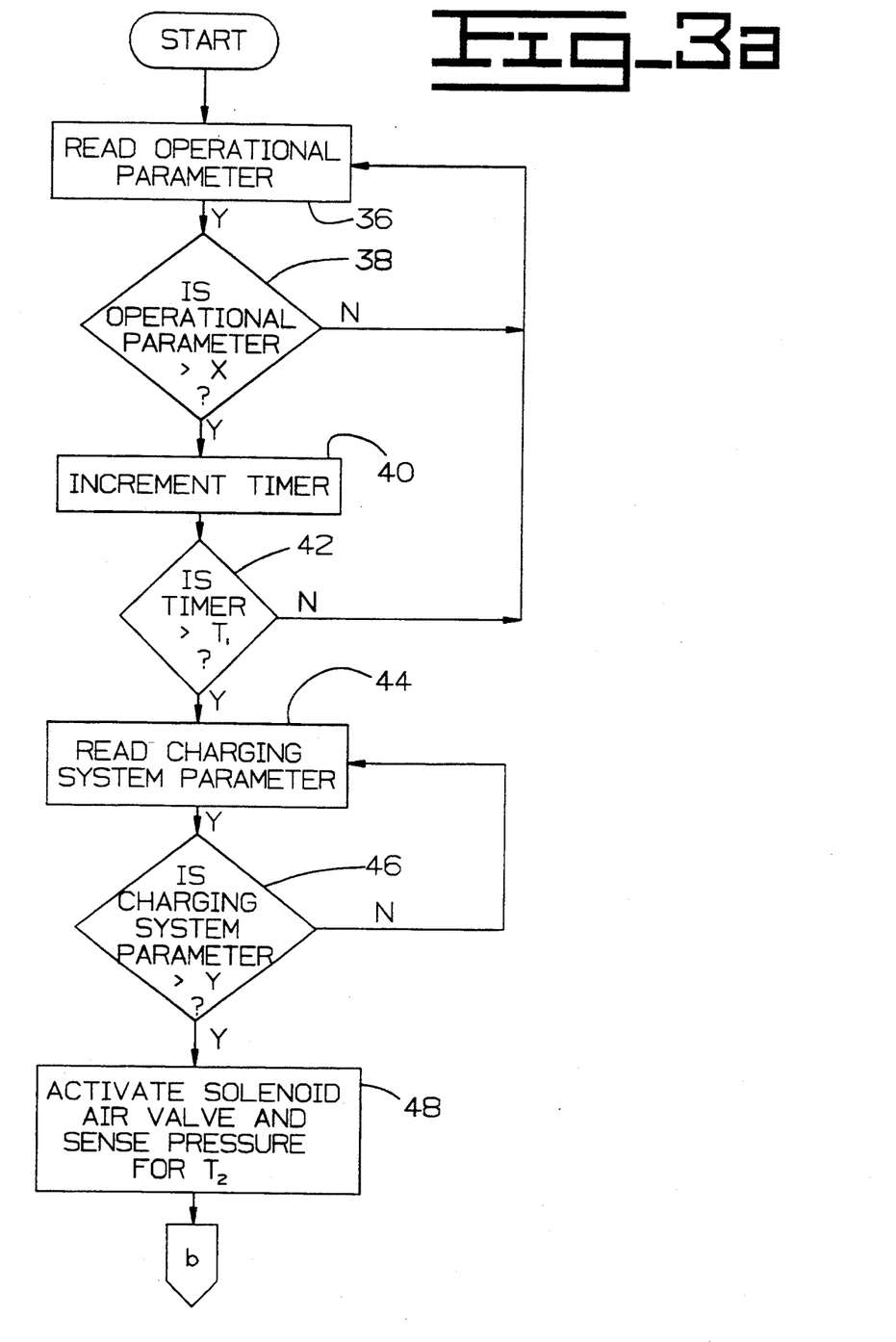
FIGS. 3a and 3b represent a flow chart of an algorithm used in an embodiment of the present invention.
Figure 3B:
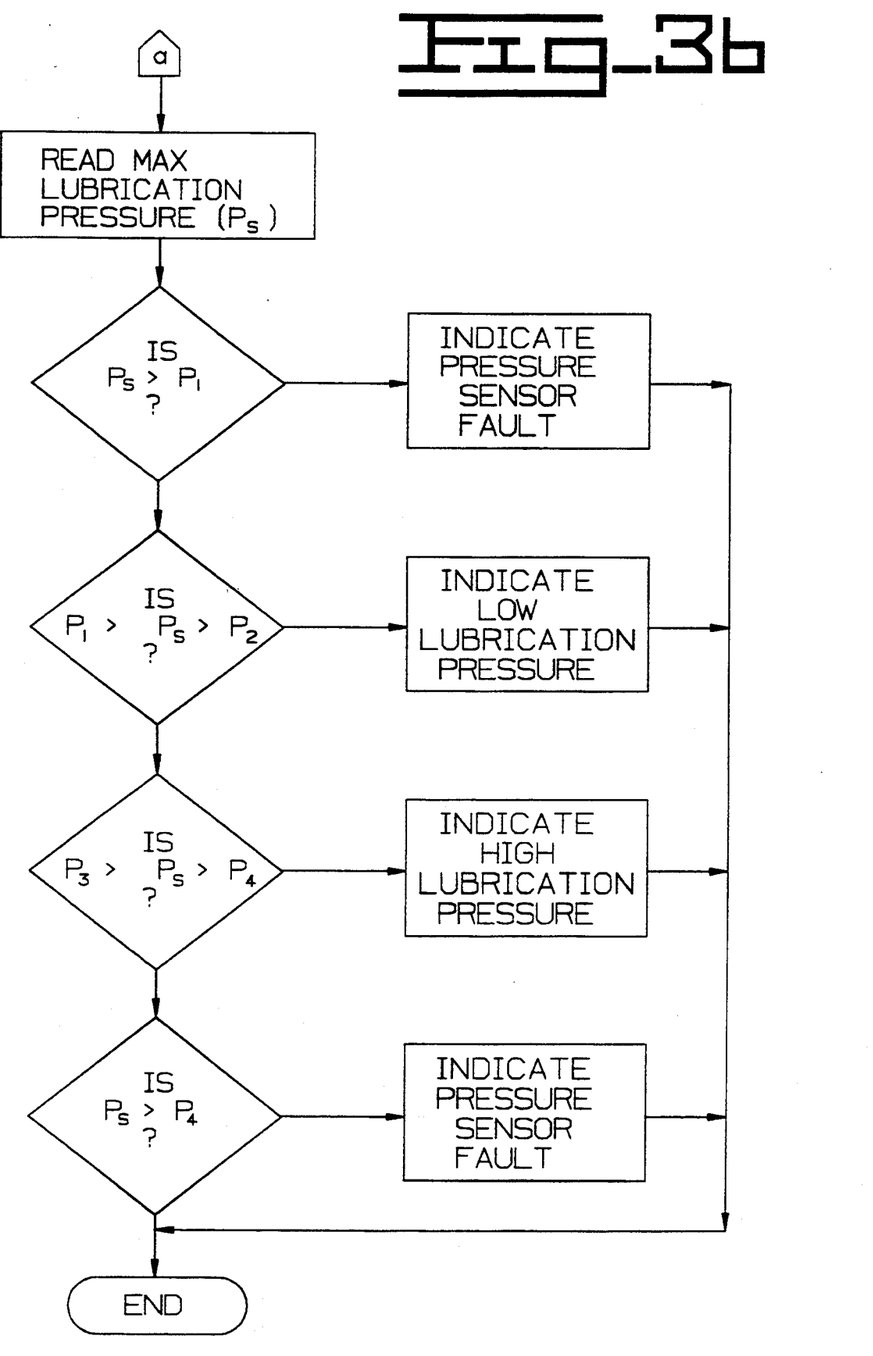

The operation of the automatic lubrication system 10 is more fully understood by reference to the algorithm illustrated in FIGS. 3a and 3b. The main module 24 reads the operational parameter and responsively determines whether the parameter is greater than a predefined value. The predefined value is selected in response to the nature of the operational parameter. For example, if the operational parameter is operation of the implement linkage of a hydraulic excavator, the predefined value is chosen to indicate whether or not a control signal is being produced to move the implement linkages. Advantageously, the operational parameter is either logic 1 or logic 0 with one of the states indicating that the control signal is being produced and the other indicating that the control signal is not being produced. Block 38 therefore becomes a determination as to whether the operational parameter is at logic 1 or logic 0. However, if the subject automatic lubrication system 10 is located on a mining truck, the predefined value is selected to indicate that the truck is moving greater than a preselected speed. For example, if the relevant speed is 2 MPH, then that value is compared to the speed indicated by the sensor associated with the speedometer in block 38 of the algorithm. It should be appreciated by those skilled in the art that other operational parameters may be utilized in connection with these and other work machines for determining whether the critical lubrication areas are being used.

If the operational parameter is greater than the predefined value, the timer is incremented and compared to a predetermined interval constant, T1. The lubrication system is also advantageously activated a certain period of time following start-up of the machine which is substantially less than T1. In the preferred embodiment, the value for T1 can be selected by the operator or service personnel through use of the operator interface 30. A service program code is entered by the operator or service personnel by pressing a predefined sequence of buttons on the operator interface 30. When the service program code is entered, the message area will show a time and the word "OFF". The arrow keys are then used to adjust the time for a longer or shorter lube OFF time. The time is set in minutes between 5 and 120. After the proper time is set, the operator or service personnel presses the "OK" key.

If the timer is less than the predetermined interval constant, then control is passed back to block 36. If the timer is greater than the predetermined interval constant, then the microprocessor in the main module 24 reads the signal from the charging system sensor to determine whether it is greater than the minimum charging level. In the preferred embodiment, the charging system sensor is the sensor providing an indication of engine RPM. As is appreciated by those skilled in the art, air system pressure is sometimes inadequate to operate the pump group 16 when the engine RPM is below a certain level. Thus, the main module 24 compares the sensed engine RPM to the level above which the air system pressure is sufficient to operate the air system. It should be understood, however, that many other charging system sensors could be provided in alternative embodiments, for example, a pressure sensor could be introduced in the air system to provide an indication of when the air system pressure is sufficient to operate the automatic lubrication system 10.

If the charging system parameter is less than the minimum charging level, then control is passed back to block 36. If the charging system parameter is greater than the minimum charging level, then the microprocessor within the main module 24 produces a signal to cause the solenoid air valve to open. When the solenoid air valve is open, air is supplied to the pump group 16 via the air system supply line 18 for a preselected duration, T2. In the preferred embodiment, the value for T2 can be selected by the operator or service personnel through use of the operator interface 30. A service program code is entered by the operator or service personnel by pressing a predefined sequence of buttons on the operator interface 30. When the service program code is entered, the message area will show a time and the word "ON". The arrow keys are then used to adjust the time for a longer or shorter lube ON time. The time is set in seconds between 40 and 150. After the proper time is set, the operator or service personnel presses the "OK" key.

While the solenoid air valve is open, the main module 24 records the maximum lubrication pressure indicated by the pressure sensor 20 during T2. If the maximum sensed pressure is less than a first level, a pressure sensor fault is indicated. Typically such a fault indicates either a short in the wire harness to ground, that the pressure sensor 20 is faulty, or that the display 28 is faulty.

If the maximum sensed pressure is greater than the first level but less than a second level, then a low pressure condition is indicated. Typically such a fault indicates that one of the lubricant supply lines 22 are broken or disconnected or that the air system is not supplying sufficient air pressure to the pump group 16.

If the maximum sensed pressure is greater than the second level but less that a third level, then a high pressure condition is indicated. Typically such a fault indicates that one of the lubricant supply lines is clogged or restricted or that the air system is supplying too high of air pressure to the pump group 16.

If the maximum sensed pressure is greater than the third level, then a pressure sensor fault is indicated. Typically such a fault indicates either a short in the wire harness to the positive battery voltage, that the pressure sensor 20 is faulty, or that the display 28 is faulty.

Advantageously, the automatic lubrication system 10 also includes a feature for manually activating the lubrication system. A third service program code is entered by the operator or service personnel by pressing a preselected sequence of buttons on the operator interface 30. This operation overrides the time set for T1 and activates the lubrication system for a period of time corresponding to T2. The diagnostic functions described above are also advantageously performed during manual operation of the system.

Figure 4:
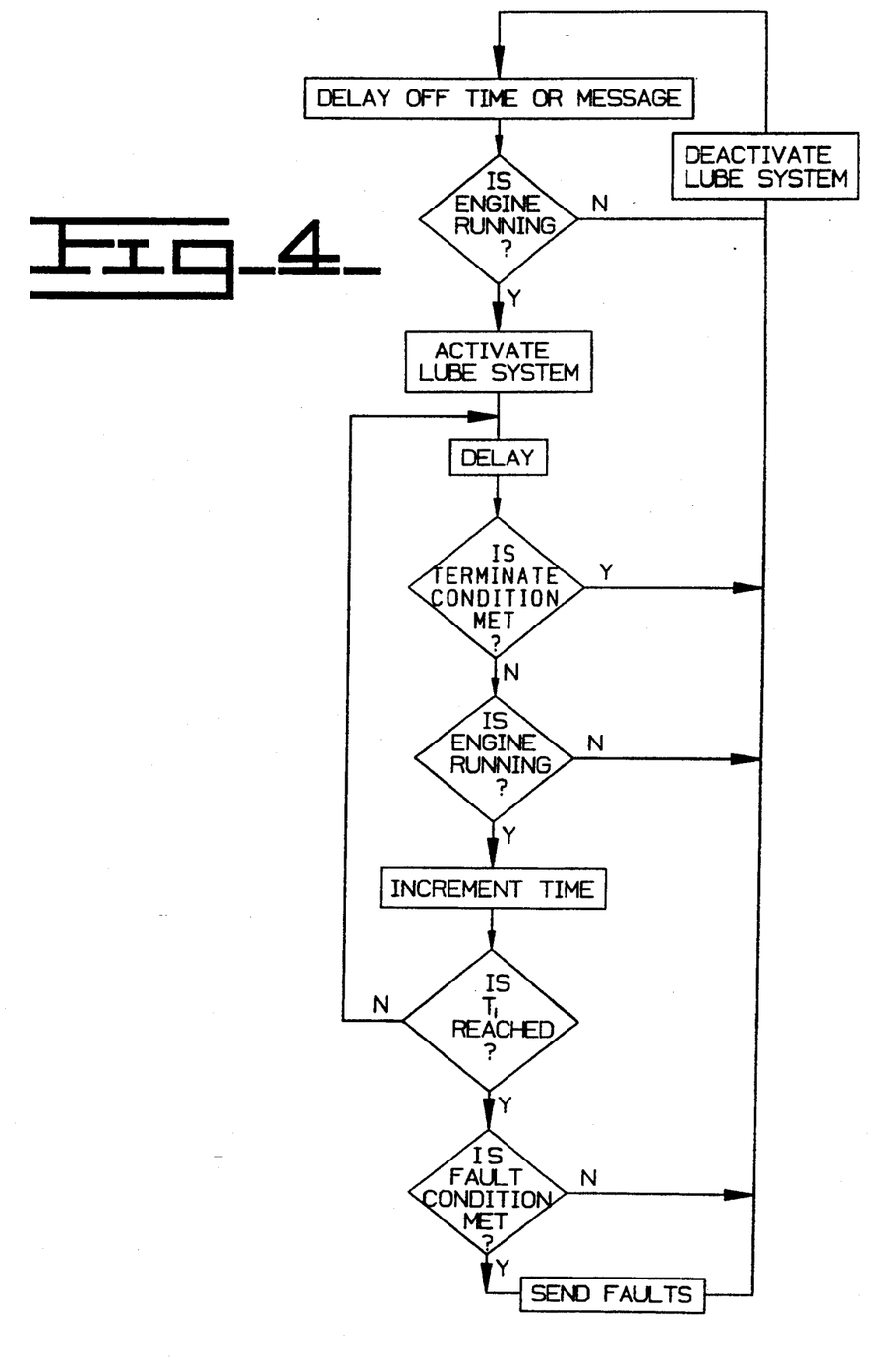
FIG. 4 illustrates a flow chart of an algorithm used in one embodiment of the present invention in connection with a mining shovel.

While the various features of the invention are described in connection with FIGS. 3a and 3b, each particular embodiment may not include all of the features or may process the sensed parameters and control the lubrication system differently. For example, one embodiment of an algorithm used in connection with the automatic lubrication system 10 on one particular type of mining shovel is illustrated in FIG. 4.

In response to either receiving a manual lubrication command or the expiration of the predetermined period of time between lubrication events, the microprocessor within the main module 24 determines whether the engine is running. In the preferred embodiment, this step involves not only sensing that the engine is running but also that it is running at a speed sufficient for proper operation of the lubrication system. If the engine is running the lubrication system is activated. After a predetermined time delay, the microprocessor in the main module 24 obtains a signal indicative of the pressure in the lubrication line. If the pressure reaches a terminate condition, the microprocessor produces a signal to deactivate the lubrication system.

If the terminate condition is not met, the system once again checks to ensure that the engine is running at a speed sufficient to operate the lubrication system. If so, the time variable is incremented and the microprocessor within the main module 24 determines whether the maximum time during which the lubrication system is to be activated has been reached. If not, the microprocessor continues to monitor the pressure and engine speed. If the maximum time has been reached, then the maximum pressure reached during lubrication is compared to a predetermined minimum to determine whether a fault should be indicated. The lubrication system is subsequently deactivated and the algorithm continues to operate as described above.

Figure 5:
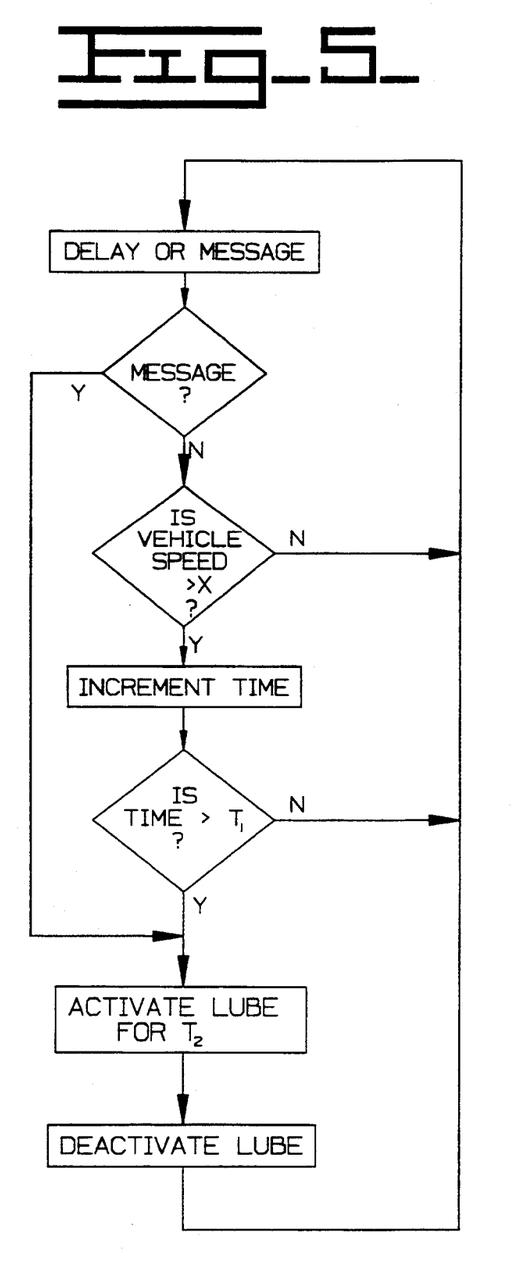
FIG. 5 illustrates a flow chart of an algorithm used in one embodiment of the present invention in connection with an off-highway truck.

Alternatively, FIG. 5 illustrates one embodiment of an algorithm used in connection with the automatic lubrication system 10 on one particular type of off-highway truck. The microprocessor within the main module 24 determines whether a machine operator has entered the code to manually activate the lubrication system. If the code for manual lubrication has been received, the lubrication system is activated for a predetermined amount of time and is then deactivated.

If the manual code has not been entered, then the microprocessor compares the machine speed to a predetermined minimum. If the machine speed exceeds the predetermined minimum, then the time variable is incremented and is compared to a predetermined constant indicating the desired length of operating time between lubricating events. If the predetermined constant is exceeded, the lubrication system is activated for a predetermined amount of time and is then deactivated. The algorithm then performs a delay and checks to determine whether a manual lubrication message has been received, and the algorithm continues to operate as described above. In both of the embodiments described in connection with FIGS. 4 and 5, the main module 24 determines whether the line from the pressure sensor is shorted to ground or system voltage as a part of its regular check of all sensors.

It should be appreciated by those skilled in the art that the particular operational parameter checks, charging system checks, and fault indications are selected by the machine designers in response to perceived customer desires and designer preferences. Thus the present invention should not be limited to any particular combination of features nor the specific parameters described herein.

Industrial Applicability

Work machines such as large off-highway mining trucks, front shovels, and hydraulic excavators include critical areas requiring frequent lubrication. For example, wheel bearings and implement linkages must be lubricated at regular intervals during operation to prevent premature failures.

Embodiments of the present invention are useful in such work machines to automatically lubricate the critical areas and to provide the operator or service personnel with significant flexibility and diagnostic capabilities. The system is also designed to reduce wasted energy and lubricant and to only activate the system when it is capable of proper operation.

Other aspects, objects, advantages and uses of this invention can be obtained from a study of the drawings, disclosure, and appended claims.

We claim:

1. An apparatus for lubricating a work machine, comprising:
   a timer;
   a lubricant distribution system;
   a charging system adapted to drive said lubricant distribution system;
   means for sensing a charging system parameter indicative of the operative state of said charging system;

means for causing said timer to calculate a time interval, said time interval being dependent on a previous lubricating event;

means for producing a lubrication signal in response to said time interval being greater than or equal to a predetermined interval constant and said charging system parameter being greater than or equal to a predetermined level; and means for activating said lubricant distribution system in response to said lubrication signal.

2. An apparatus, as set forth in claim 1, wherein said charging system parameter is engine speed.

3. An apparatus, as set forth in claim 1, wherein said charging system parameter is air system supply pressure.

4. An apparatus, as set forth in claim 1, wherein said charging system includes an air system supply line, a lubrication pump, and a solenoid air valve being connected to and between said air system supply line and said lubrication pump; said solenoid air valve being adapted to allow air from said air system supply line to flow to said lubrication pump in response to said lubrication signal, whereby said lubrication pump is driven by air from said air system supply line when said lubrication signal is delivered to said solenoid air valve.

* * * * *